United States Patent
Latapie et al.

(10) Patent No.: US 12,536,800 B2
(45) Date of Patent: Jan. 27, 2026

(54) PRIVACY PRESERVING PERSON REIDENTIFICATION

(71) Applicant: Cisco Technology, Inc., San Jose, CA (US)

(72) Inventors: Hugo Latapie, Long Beach, CA (US); Gaowen Liu, Austin, TX (US); Ozkan Kilic, Long Beach, CA (US); Adam James Lawrence, Pasadena, CA (US); Ramana Rao V. R. Kompella, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 402 days.

(21) Appl. No.: 18/113,175

(22) Filed: Feb. 23, 2023

(65) Prior Publication Data

US 2024/0290098 A1    Aug. 29, 2024

(51) Int. Cl.
| | |
|---|---|
| *G06K 9/00* | (2022.01) |
| *G06V 10/46* | (2022.01) |
| *G06V 10/75* | (2022.01) |
| *G06V 10/764* | (2022.01) |
| *G06V 10/82* | (2022.01) |

(Continued)

(52) U.S. Cl.
CPC ............ *G06V 20/48* (2022.01); *G06V 10/462* (2022.01); *G06V 10/757* (2022.01); *G06V 10/764* (2022.01); *G06V 10/82* (2022.01); *G06V 20/52* (2022.01)

(58) Field of Classification Search
None
See application file for complete search history.

(56) References Cited

U.S. PATENT DOCUMENTS

| | | | |
|---|---|---|---|
| 8,195,598 B2 | 6/2012 | Hua et al. | |
| 8,620,028 B2 | 12/2013 | Eaton et al. | |

(Continued)

FOREIGN PATENT DOCUMENTS

| | | |
|---|---|---|
| WO | WO-2015027289 A1 | 3/2015 |
| WO | WO-2019168323 A1 | 9/2019 |
| WO | WO-2021251062 A1 | 12/2021 |

OTHER PUBLICATIONS

Munaro et al., "A feature-based approach to people re-identification using skeleton keypoints," 2014 IEEE International Conference on Robotics and Automation (ICRA), Hong Kong, China, 2014, pp. 5644-5651, doi: 10.1109/ICRA.2014.6907689. (Year: 2014).*

(Continued)

*Primary Examiner* — Feng Niu
(74) *Attorney, Agent, or Firm* — Lee & Hayes, P.C.

(57) ABSTRACT

In one embodiment, a device represents each of a plurality of objects depicted in video data captured by a plurality of cameras over time as a set of key points associated with that object. The device forms, for each of the plurality of objects, a set of timeseries of the set of key points associated with that object. The device performs reidentification of a particular one of the plurality of objects across video data captured by two or more of the plurality of cameras by matching sets of timeseries of key points associated with that object derived from video data captured by two or more of the plurality of cameras. The device provides an indication of the reidentification for display to a user.

20 Claims, 7 Drawing Sheets

(51) Int. Cl.
   *G06V 20/40* (2022.01)
   *G06V 20/52* (2022.01)

(56) References Cited

U.S. PATENT DOCUMENTS

| | | | |
|---|---|---|---|
| 10,887,197 B2 | 1/2021 | Fenoglio et al. | |
| 10,916,018 B2* | 2/2021 | Tasaki | H04N 19/43 |
| 10,965,516 B2 | 3/2021 | Fenoglio et al. | |
| 11,336,506 B1 | 5/2022 | Li et al. | |
| 2005/0180603 A1 | 8/2005 | Zoghlami et al. | |
| 2008/0069482 A1 | 3/2008 | Komiya | |
| 2010/0322516 A1 | 12/2010 | Xu et al. | |
| 2011/0051992 A1 | 3/2011 | Cobb et al. | |
| 2012/0063641 A1 | 3/2012 | Venkatesh et al. | |
| 2013/0174116 A1 | 7/2013 | Pfeifer | |
| 2013/0191357 A1 | 7/2013 | Hanis et al. | |
| 2014/0294233 A1* | 10/2014 | Osamura | G06T 7/593 |
| | | | 382/103 |
| 2015/0186779 A1 | 7/2015 | Deng et al. | |
| 2016/0014305 A1* | 1/2016 | Schlattmann | G06V 20/48 |
| | | | 348/515 |
| 2016/0105617 A1 | 4/2016 | Kirkby et al. | |
| 2016/0328613 A1 | 11/2016 | Gaidon et al. | |
| 2016/0364377 A1 | 12/2016 | Krishnamurthy | |
| 2019/0029604 A1* | 1/2019 | Jones | A61B 5/7278 |
| 2019/0325259 A1 | 10/2019 | Murphy | |
| 2019/0377824 A1 | 12/2019 | Wang et al. | |
| 2020/0251091 A1 | 8/2020 | Zhao | |
| 2020/0319715 A1 | 10/2020 | Holz | |
| 2020/0334008 A1 | 10/2020 | Spector et al. | |
| 2020/0349390 A1 | 11/2020 | Konwar et al. | |
| 2021/0042532 A1 | 2/2021 | Latapie et al. | |
| 2021/0174155 A1 | 6/2021 | Smith et al. | |
| 2021/0225409 A1 | 7/2021 | Lawlor | |
| 2021/0258652 A1 | 8/2021 | Li et al. | |
| 2021/0279615 A1 | 9/2021 | Latapie et al. | |
| 2021/0312773 A1 | 10/2021 | Debnath et al. | |
| 2021/0390423 A1 | 12/2021 | Latapie et al. | |
| 2021/0397849 A1 | 12/2021 | Lin et al. | |
| 2022/0138509 A1 | 5/2022 | Crosby et al. | |
| 2022/0156520 A1 | 5/2022 | Brower | |
| 2022/0157054 A1 | 5/2022 | Lin et al. | |
| 2023/0316562 A1* | 10/2023 | Stephen | G06V 10/25 |
| | | | 382/103 |
| 2025/0124741 A1* | 4/2025 | Wakai | A61B 5/11 |

OTHER PUBLICATIONS

Hamdoun et al., "Person re-identification in multi-camera system by signature based on interest point descriptors collected on short video sequences," 2008 Second ACM/IEEE International Conference on Distributed Smart Cameras, Palo Alto, CA, USA, 2008, pp. 1-6, doi: 10.1109/ICDSC.2008.4635689. (Year: 2008).*

Chen et al., "Keypoint message passing for video-based person re-identification." In Proceedings of the AAAI Conference on Artificial Intelligence, vol. 36, No. 1, pp. 239-247. 2022. (Year: 2022).*

Roeper et al., "Privacy-preserving, indoor occupant localization using a network of single-pixel sensors." In 2016 13th IEEE International Conference on Advanced Video and Signal Based Surveillance (AVSS), pp. 214-220. IEEE, 2016. (Year: 2016).*

Agrawal, et al., "VQA: Visual Question Answering", Proceedings of the IEEE International Conference on Computer Vision (ICCV), 2015, 25 pages, arXiv:1505.00468v7 [cs.CL].

Ahmed, et al., "Reflection Detection in Image Sequences", CVPR 2011, Jun./Jul. 2011, 9 pages, IEEE, Colorado Springs, CO.

Aleksander, Igor, "Machine consciousness" In Scholarpedia. 3(2):4162, Oct. 21, 2011, 7 pages.

Anderson, et al., "Bottom-Up and Top-Down Attention for Image Captioning and Visual Question Answering", 2018 IEEE/CVF Conference on Computer Vision and Pattern Recognition, Jun. 2018, pp. 6077-6086, IEEE, Salt Lake City, Utah.

Baudrillard, Jean, "Simulacra and Simulation", 1981, 159 pages, Galilee.

Arróspide, et al., "Homography-based ground plane detection using a single on-board camera", IET Intelligent Transport Systems 4(2), Jul. 2010, 149-160, IEEE.

Baz, et al., "Context-aware hybrid classification system for fine-grained retail product recognition", 2016 IEEE 12th Image, Video, and Multidimensional Signal Processing Workshop (IVMSP), Jul. 2016, 5 pages, IEEE, Bordeaux, France.

Bělohlávek, Radim, "Concept lattices and order in fuzzy logic", Annals of Pure and Applied Logic 128 (2004) 277-298, Elsevier.

Box, G. E. P., "Science and Statistics", In Journal of the American Statistical Association, 71(356), Dec. 1976, pp. 791-799.

Chalmers, David J., "The Conscious Mind: In Search of a Fundamental Theory", 1996, 433 pages, Oxford University Press, New York.

Chella, et al., "A cognitive framework for imitation learning", Robotics and Autonomous Systems 54, Mar. 2006, pp. 403-408, Elsevier.

Chella, et al., "Artificial Consciousness", Chapter 20, In Perception-Action Cycle, 2011, pp. 637-671, Springer, New York.

Chella, et al., "Machine Consciousness: A Manifesto for Robotics", In International Journal of Machine Consciousness, 1(1), Jun. 2009, pp. 33-51, World Scientific Publishing Company.

Cohen, Paul R., "Projections as Concepts", Computer Science Department Faculty Publication Series (194), https://scholarworks.umass.edu/cs/_faculty/_pubs/194, 1997, 6 pages, University of Massachusetts, Amherst.

Cui, et al., "A survey on network embedding", IEEE Transactions on Knowledge and Data Engineering, vol. 31, Issue: 5, May 1, 2019, pp. 833-852, IEEE.

"D2.5 Profiling, Analytics and Privacy Methodological Foundations, Release II", Child Rescue, Collective Awareness Platform for Missing Children Investigation and Rescue, version 1, Jan. 2020, Horizon 2020 Programme of the European Union.

D'Amour, et al., "Underspecification Presents Challenges for Credibility in Modern Machine Learning", Underspecification in Machine Learning, online: https://arxiv.org/pdf/2011.03395.pdf, Nov. 2020, 59 pages.

De Bono, Edward, "The Mechanism of Mind", 1967, 276 pages, Penguin Books.

Düntsch, et al., "Modal-style operators in qualitative data analysis", 2002 IEEE International Conference on Data Mining, 2002. Proceedings, Dec. 2002, pp. 155-162, IEEE, Maebashi City, Japan.

Franco, et al., "Grocery product detection and recognition", Expert Systems With Applications 81 (2017), pp. 163-176, Elsevier Ltd.

George, et al., "Recognizing Products: A Per-exemplar Multi-label Image Classification Approach", ECCV 2014, Part II, LNCS 8690, 2014, pp. 440-455, Springer International Publishing Switzerland.

Goertzel, et al., "CogPrime Architecture for Embodied Artificial General Intelligence", 2013 IEEE Symposium on Computational Intelligence for Human-like Intelligence (CIHLI), Apr. 2013, pp. 60-67, IEEE, Singapore.

Goertzel, Ben, "OpenCogPrime: A Cognitive Synergy Based Architecture for Artificial General Intelligence", 2009 8th IEEE International Conference on Cognitive Informatics, Jun. 2009, pp. 60-68, IEEE, Hong Kong, China.

Gorban, et al., "Blessing of dimensionality: mathematical foundations of the statistical physics of data", Philosophical Transactions of the Royal Society A: Mathematical, Physical and Engineering Sciences, 376.2118, Jan. 2008, 18 pages, The Royal Society Publishing.

Grover, et al., "node2vec: Scalable Feature Learning for Networks", KDD '16: Proceedings of the 22nd ACM SIGKDD International Conference on Knowledge Discovery and Data Mining, Aug. 2016, pp. 855-864, Association for Computing Machinery, New York, NY.

Hamilton, et al., "Representation Learning on Graphs: Methods and Applications", Bulletin of the IEEE Computer Society Technical Committee on Data Engineering, 2017, 23 pages, IEEE.

Hammer, et al., "A Reasoning Based Model for Anomaly Detection in the Smart City Domain", IntelliSys 2020, AISC 1251, pp. 144-159, 2021, Springer Nature Switzerland AG.

(56) References Cited

OTHER PUBLICATIONS

Hobbs, Jerry R., "Granularity", In Proceedings of the Ninth International Joint Conference on Artificial Intelligence, 1985, pp. 432-435, Morgan Kaufmann.
Horowitz, Alexandra, "Smelling themselves: Dogs investigate their own odours longer when modified in an "olfactory mirror" test", Behavioural Processes, 2017, 41 pages.
Jacob, et al., "A Demonstration of the Exathlon Benchmarking Platform for Explainable Anomaly Detection", Proceedings of the VLDB Endowment (PVLDB), Oct. 2021, 5 pages, HAL Open Science.
Jawed, et al., "Self-Supervised Learning for Semi-Supervised Time Series Classification", Pacific-Asia Conference on Knowledge Discovery and Data Mining, PAKDD 2020: Advances in Knowledge Discovery and Data Mining, May 2020, pp. 499-511, Lecture Notes in Computer Science, vol. 12084.
Johnson, Mark, "The Body in The Mind", 1987, 268 pages, The University of Chicago Press.
Jordan, Jeremy, "An Overview of Semantic Image Segmentation", online: https://www.jeremyjordan.me/semantic-segmentation/, May 21, 2018, 20 pages.
Kiryati, et al., "A probabilistic Hough transform", Pattern Recognition. 24(4), 1991, pp. 303-316, The Pattern Recognition Society.
Korzybski, Alfred, "Manhood of Humanity, The Science and Art of Human Engineering", 1921, 240 pages, E. P. Dutton & Company, New York, NY.
Korzybski, Alfred, "Science and Sanity: An Introduction to Non-Aristotelian Systems and General Semantics", 5th Edition, 1994, 910 pages, Institute of General Semantics, New York, NY.
Korzybski, Alfred, "Videos—This Is Not That", online: https://www.thisisnotthat.com/korzybski-videos/, accessed Nov. 18, 2021, 7 pages.
Lakoff, G., "Women, Fire, and Dangerous Things", 1984, 631 pages, University of Chicago Press.
Latapie, et al., "A Metamodel and Framework for Artificial General Intelligence from Theory to Practice", Journal of Artificial Intelligence and Consciousness, Feb. 12, 2021, 1:30, 24 pages, World Scientific Publishing Company.
Li, et al., "Concept learning via granular computing: A cognitive viewpoint", Information Sciences 298 (2015), Published Dec. 2014, pp. 447-467, Elsevier Inc.
Li, et al., "Self-supervised Social Relation Representation for Human Group Detection", European Conference on Computer Vision (ECCV 2022, Oral), 17 pages.
Lin, et al., "Progressive Mirror Detection", 2020 IEEE/CVF Conference on Computer Vision and Pattern Recognition (CVPR), Jun. 2020, 9 pages, IEEE, Seattle, WA.
Ma, et al., "Granular computing and Dual Galois Connection", Information Sciences, 177(23), 2007, pp. 5365-5377, Elsevier Inc.
Macaulay, Thomas, "Facebook's chief AI scientist says GPT-3 is 'not a very good' Q&A system", online: https://thenextweb.com/news/facebooks-yann-lecun-says-gpt-3-is-not-very-good-as-a-qa-or-dialog-system, Oct. 28, 2020, accessed Nov. 18, 2021, 3 pages.
Murahari, et la., "Improving Generative Visual Dialog by Answering Diverse Questions", Proceedings of the 2019 Conference on Empirical Methods in Natural Language Processing and the 9th International Joint Conference on Natural Language Processing, Nov. 2018, pp. 1449-1454, Association for Computational Linguistics, Hong Kong, China.
Nauman, et al., "Identification of Anomalous Behavioral Patterns in Crowd Scenes", Computers, Materials & Continua, 71(1), Jan. 2022, pp. 925-939.
Park, et al., "Identifying Reflected Images from Object Detector in Indoor Environment Utilizing Depth Information", IEEE Robotics and Automation Letters, vol. 6, No. 2, Apr. 2021, pp. 635-642, IEEE.
Patel, et al., "Video Representation and Suspicious Event Detection Using Semantic Technologies", online: http://semantic-web-journal.net/system/files/swj2427.pdf, Semantic Web 0, Sep. 10, 2020, accessed Aug. 9, 2021, 25 pages, IOS Press.
Pauli, Wolfgang, "Part I. General: (A) theory. Some relations between electrochemical behaviour and the structure of colloids", Jan. 1935, pp. 11-27, Transactions of the Faraday Society, vol. 1.
Rao, et al., "Detection of Anomalous Crowd Behaviour Using Hyperspherical Clustering", "Detection of Anomalous Crowd Behaviour Using Hyperspherical Clustering", Nov. 2014, IEEE, Wollongong, NSW, Australia.
Sanchez, et al., "Revisiting crowd behaviour analysis through deep learning: Taxonomy, anomaly detection, crowd emotions, datasets, opportunities and prospects", Inf Fusion, 97, (2020), Published online Jul. 29, 2020, pp. 318-335, Elsevier B.V.
Scarselli, et al., "The Graph Neural Network Model", IEEE Transactions on Neural Networks (vol. 20, Issue: 1, Jan. 2009), pp. 61-80, IEEE.
Speer, et al., "ConceptNet 5.5: An Open Multilingual Graph of General Knowledge", online: https://arxiv.org/pdf/1612.03975.pdf, 2017, 9 pagers, Association for the Advancement of Artificial Intelligence.
Swanson, Bret, "The Exponential Internet", online: https://www.uschamberfoundation.org/bhq/exponential-internet, accessed Nov. 19, 2021, 8 pages, The U.S. Chamber of Commerce Foundation.
Tan, et al., "EfficientDet: Scalable and Efficient Object Detection", online: https://arxiv.org/pdf/1911.09070.pdf, Jul. 2020, 10 pages.
Taylor, J. G., "CODAM: A neural network model of consciousness", Neural Networks 20 (2007), pp. 983-992, Elsevier Ltd.
Thórisson, et al., "Cumulative Learning", Artificial General Intelligence—12th International Conference, AGI 2019, Proceedings, pp. 198-208, Springer.
Thórisson, Kristinn R., "A New Constructivist AI: From Manual Methods to Self-Constructive Systems", Chapter 9, Apr. 2012, pp. 147-174, Atlantis Press Book.
Thórisson, Kristinn R., "Integrated AI Systems", Minds & Machines 17, Mar. 2007, pp. 11-25.
Tonioni, et al., "Product recognition in store shelves as a sub-graph isomorphism problem", online: https://arxiv.org/abs/1707.08378, Sep. 2017, 14 pages.
Tripathy, et al., "Explaining Anomalies in Industrial Multivariate Time-Series Data with the Help of eXplainable AI", 2022 IEEE International Conference on Big Data and Smart Computing (BigComp), Jan. 2022, 8 pages, IEEE, Republic of Korea.
Unger, et al., "The Singular Universe and the Reality of Time: A Proposal in Natural Philosophy", 2015, 558 pages, Cambridge University Press.
Unger, R. M. 2014. "Roberto Unger: Free Classical Social Theory from Illusions of False Necessity", Online Lecture. 45 pages Retrieved on Nov. 22, 2021 from https://www.youtube.com/watch?v=yYOOwNRFTcY.
Wang, et al., "Concept Analysis via Rough Set and AFS Algebra", Information Sciences 178 (2008), pp. 4125-4137, Elsevier Inc.
Wang, Pei, "Experience-grounded semantics: a theory for intelligent systems", Aug. 2004, 33 pages, Elsevier Science.
Wang, Pei, "Insufficient Knowledge and Resources—A Biological Constraint and Its Functional Implications", Biologically Inspired Cognitive Architectures II: Papers from the AAAI Fall Symposium (FS-09-01), 2009, pp. 188-193, Association for the Advancement of Artificial Intelligence (www.aaai.org).
Wang, Pei, "Non-axiomatic logic (nal) specification", online: http://citeseerx.ist.psu.edu/viewdoc/download?doi=10.1.1.167.2069&rep=rep1&type=pdf, Oct. 2009, 88 pages.
Wang, Pei, "On Defining Artificial Intelligence", Journal of Artificial General Intelligence 10(2) 2019, pp. 1-37, Sciendo.
Wang, et al. "Self in NARS, an AGI System", vol. 5, Article 20, Mar. 2018, 15 pages, Frontiers in Robotics and AI.
Wang, et al., "SuperGLUE: A Stickier Benchmark for General-Purpose Language Understanding Systems", online: https://arxiv.org/pdf/1905.00537.pdf, 2019, 29 pages, 33rd Conference on Neural Information Processing Systems (NeurIPS 2019), Vancouver, Canada.
Wikipedia, "Wheat and chessboard problem", online: https://en.wikipedia.org/wiki/Wheat_and_chessboard_problem, Oct. 2021, 5 pages, Wikimedia Foundation, Inc.

(56) References Cited

OTHER PUBLICATIONS

Wille, Rudolf, "Restructuring Lattice Theory: An Approach Based on Hierarchies of Concepts", I. Rival (Ed.), Ordered Sets, 1982, pp. 314-339.

Xue, et al., "Real-Time Anomaly Detection and Feature Analysis Based on Time Series for Surveillance Video", IEEE 5th International Conference on Universal Village • UV2020 • Session 3ABD-7, Oct. 2020, 7 pages, IEEE, Boston, MA.

Yang, et al., "Semi-automatic Image and Video Annotation System for Generating Ground Truth Information", 2018 International Conference on Information Networking (ICOIN), Jan. 2018, pp. 821-824, IEEE, Chiang Mai, Thailand.

Yao, et al., "A Granular Computing Paradigm for Concept Learning", Emerging Paradigms in Machine Learning, Springer, London, pp. 307-326, 2012.

Yao, Y. Y., "Information Granulation and Rough Set Approximation", International Journal of Intelligent Systems, vol. 16, No. 1, 87-104, 2001.

Yao, Y. Y., "Integrative levels of granularity", Human-Centric Information Processing Through Granular Modelling, 2009, 20 pages, Studies in Computational Intelligence, vol. 182. Springer, Berlin, Heidelberg.

Ying, et al., "Graph convolutional neural networks for web-scale recommender systems", online: https://arxiv.org/pdf/1806.01973.pdf, In KDD '18: The 24th ACM SIGKDD International Conference on Knowledge Discovery & Data Mining, Aug. 19-23, 2018, London, United Kingdom. ACM, New York, NY, USA, 10 pages.

Zhou, et al., "Graph neural networks: A review of methods and applications", AI Open, 2020, pp. 57-81, Elsevier B.V.

Zhu, et al., "Describing Unseen Videos via Multi-modal Cooperative Dialog Agents" Computer Vision—ECCV 2020, 17 pages, Lecture Notes in Computer Science, vol. 12368. Springer.

\* cited by examiner

PRIVACY PRESERVING PERSON REIDENTIFICATION

TECHNICAL FIELD

The present disclosure relates generally to computer networks, and, more particularly, to privacy preserving person reidentification.

BACKGROUND

With the advents of machine and deep learning, video analytics systems have grown in both their capabilities, as well as their complexities. One use for such systems exists in the context of multi-camera surveillance systems, to detect people and other objects and make decisions about their behaviors. For instance, a surveillance system in an airport or other sensitive area may seek to detect when a person leaves an object unattended.

Despite the recent advances in video analytics, person re-identification still remains a challenging task. In general, person re-identification refers to the ability of the video analytics system to determine that the same person is present in different video frames that differ temporally and/or spatially (e.g., from different cameras).

Traditionally, facial recognition has been the gold standard for person re-identification, as a person's face typically has enough unique characteristics for a learning model to distinguish between people and the match one image of a person to another image of that person. However, the proliferation of facial recognition has also raised numerous privacy concern.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device represents each of a plurality of objects depicted in video data captured by a plurality of cameras over time as a set of key points associated with that object. The device forms, for each of the plurality of objects, a set of timeseries of the set of key points associated with that object. The device performs reidentification of a particular one of the plurality of objects across video data captured by two or more of the plurality of cameras by matching sets of timeseries of key points associated with that object derived from video data captured by two or more of the plurality of cameras. The device provides an indication of the reidentification for display to a user.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or wired networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
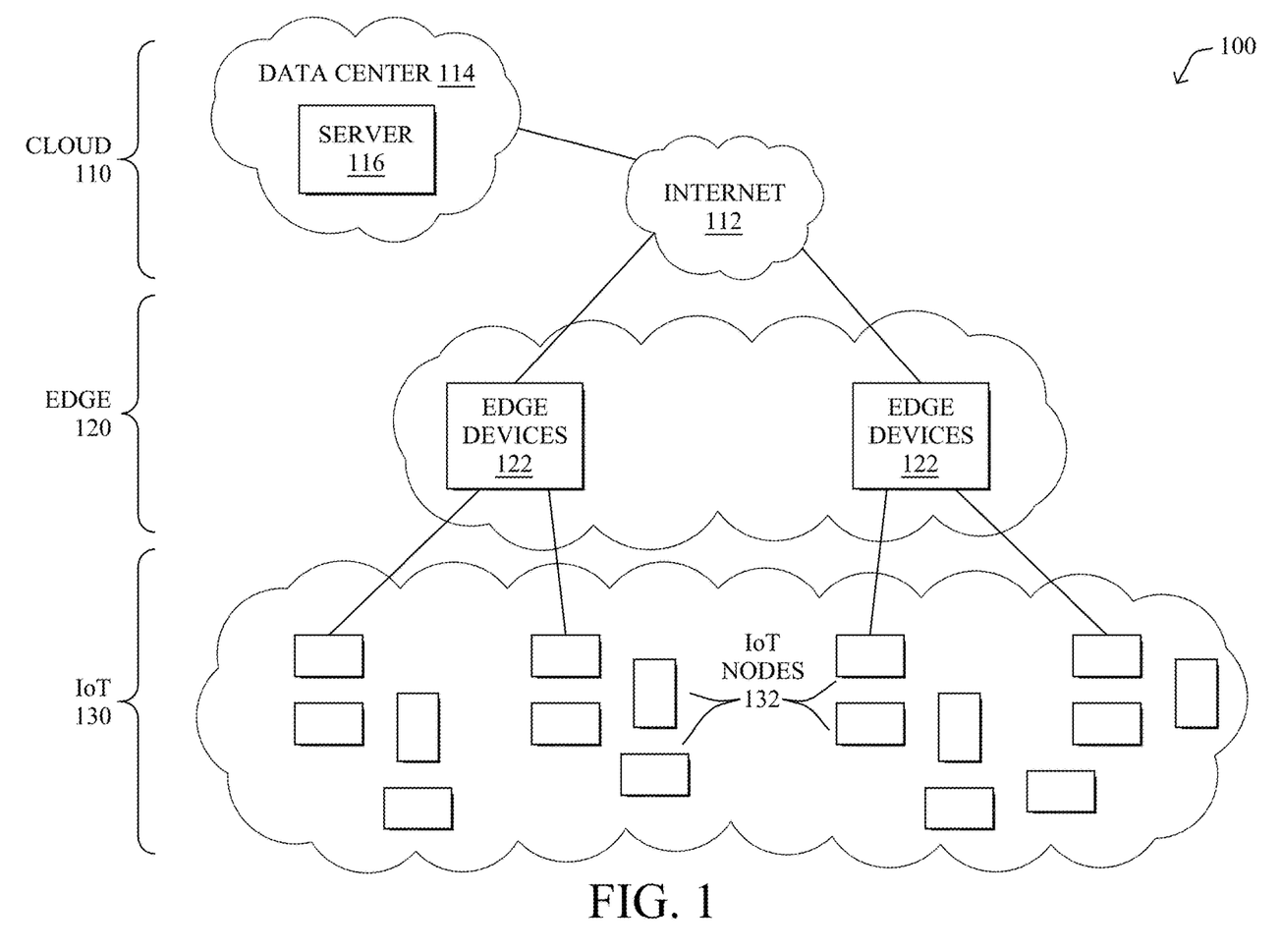
FIG. 1 illustrate an example network.

FIG. 1 is a schematic block diagram of an example simplified computer network 100 illustratively comprising nodes/devices at various levels of the network, interconnected by various methods of communication. For instance, the links may be wired links or shared media (e.g., wireless links, wired links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), or other shared-media protocols where appropriate. In this context, a protocol consists of a set of rules defining how the nodes interact with each other.

Figure 2:
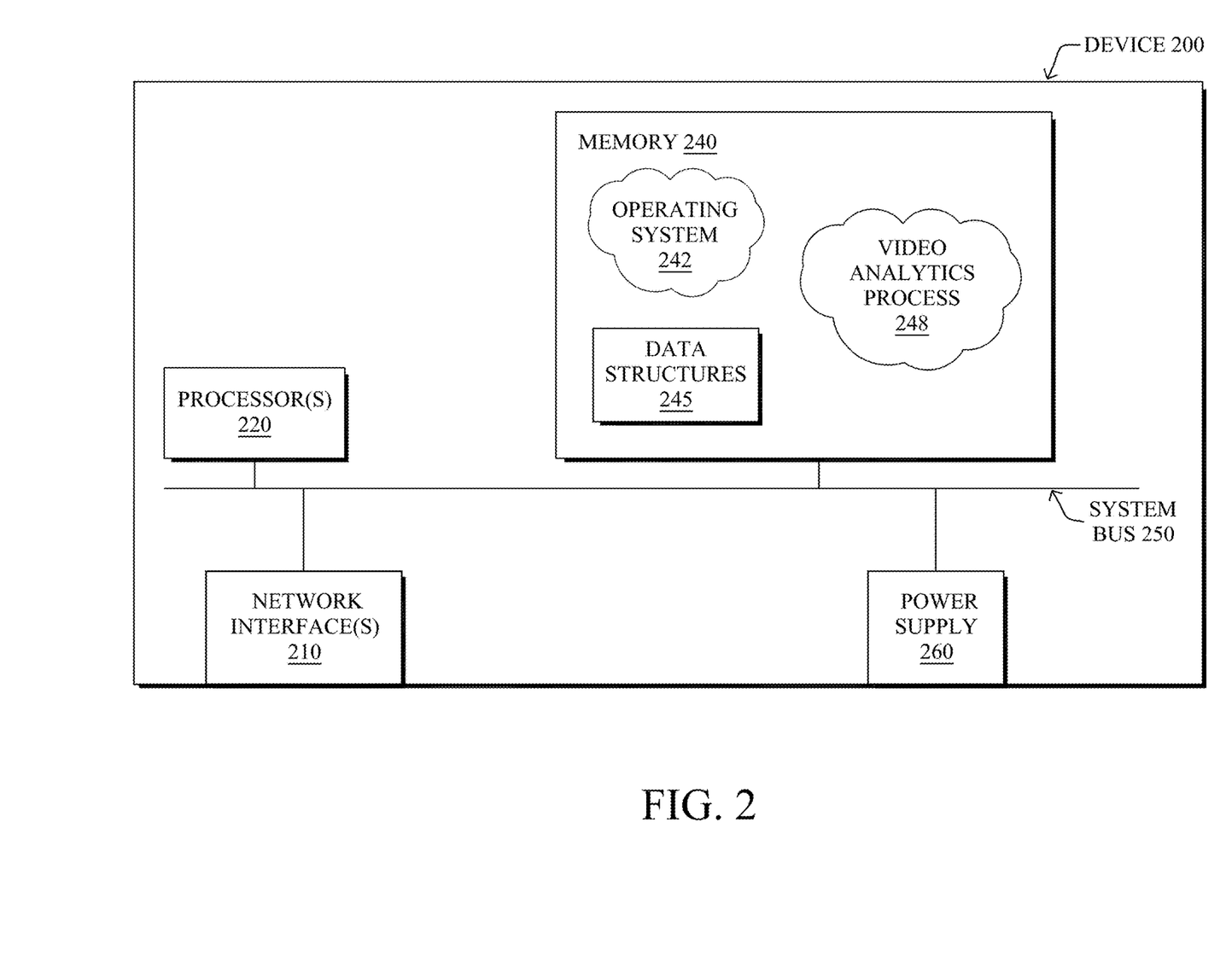
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative video analytics process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments, video analytics process 248 may employ one or more supervised, unsupervised, or self-supervised machine learning models. Generally, supervised learning entails the use of a training set of data that is used to train the model to apply labels to the input data. For example, the training data may include sample video data depicting a particular event that has been labeled as such. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Self-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Figure 3:
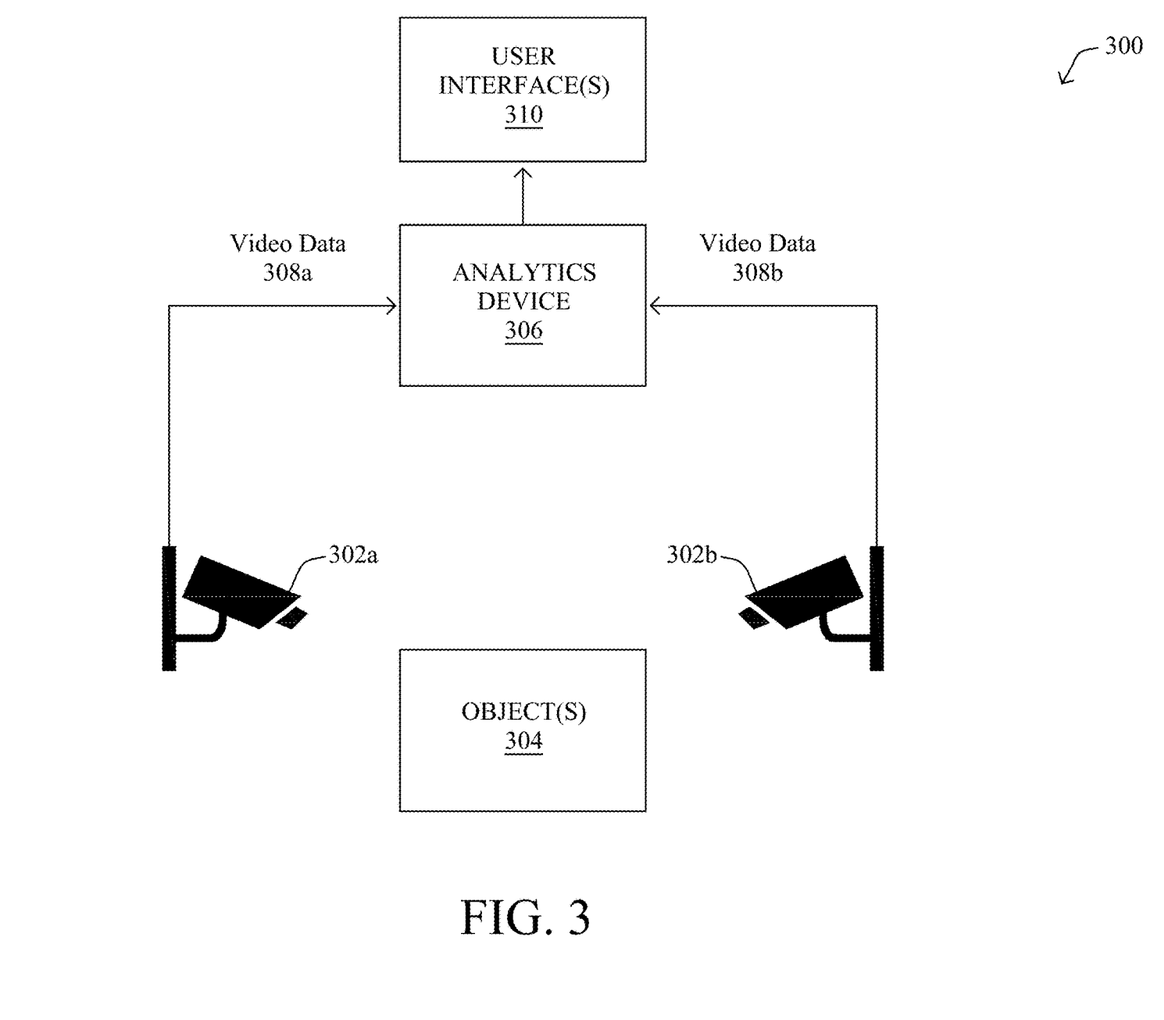
FIG. 3 illustrates an example system for performing video analytics.

FIG. 3 illustrates an example system 300 for performing video analytics, as described in greater detail above. As shown, there may be any number of cameras 302 deployed to a physical area, such as cameras 302a-302b. Such surveillance is now fairly ubiquitous across various locations including, but not limited to, public transportation facilities (e.g., train stations, bus stations, airports, etc.), entertainment facilities (e.g., sports arenas, casinos, theaters, etc.), schools, office buildings, and the like. In addition, so-called "smart" cities are also now deploying surveillance systems for purposes of monitoring vehicular traffic, crime, and other public safety events.

Regardless of the deployment location, cameras 302a-302b may generate and send video data 308a-308b, respectively, to an analytics device 306 (e.g., a device 200 executing video analytics process 248 in FIG. 2). For instance, analytics device 306 may be an edge device (e.g., an edge device 122 in FIG. 1), a remote server (e.g., a server 116 in FIG. 1), or may even take the form of a particular endpoint in the network, such as a dedicated analytics device, a particular camera 302, or the lie.

In general, analytics device 306 may be configured to provide video data 308a-308b for display to one or more user interfaces 310, as well as to analyze the video data for events that may be of interest to a potential user. To this end, analytics device 306 may perform object detection on video data 308a-308b, to detect and track any number of objects 304 present in the physical area and depicted in the video data 308a-308b. In some embodiments, analytics device 306 may also perform object re-identification on video data 308a-308b, allowing it to recognize an object 304 in video data 308a as being the same object in video data 308b or vice-versa.

As noted above, with the advents of machine and deep learning, video analytics systems have grown in both their capabilities, as well as their complexities. One use for such systems exists in the context of multi-camera surveillance systems, to detect people and other objects and make decisions about their behaviors. For instance, a surveillance system in an airport or other sensitive area may seek to detect when a person leaves an object unattended.

Despite the recent advances in video analytics, person re-identification still remains a challenging task. In general, person re-identification refers to the ability of the video analytics system to determine that the same person is present in different video frames that differ temporally and/or spatially (e.g., from different cameras).

Traditionally. facial recognition has been the gold standard for person re-identification, as a person's face typically has enough unique characteristics for a learning model to distinguish between people and the match one image of a person to another image of that person. However, the proliferation of facial recognition has also raised numerous privacy concern.

Privacy Preserving Person Reidentification

The techniques herein introduce timeseries-based analysis of video for purposes of re-identifying different people or other objects across different video feeds. In some aspects, the object may be represented as a set of key points whose locations and relationships with one another may be tracked over time, thereby forming timeseries, which effectively serve as 'fingerprints' for the object across the video data. By matching the characteristics of these timeseries across different video feeds, the system can identify an object depicted in the video from two or more cameras as being the same, thereby eliminating the need for facial recognition entirely.

Illustratively, the techniques described herein may be performed by hardware, software, and/or firmware, such as in accordance with the video analytics process 248, which may include computer executable instructions executed by the processor 220 (or independent processor of interfaces 210), to perform functions relating to the techniques described herein.

Specifically, according to various embodiments, a device represents each of a plurality of objects depicted in video data captured by a plurality of cameras over time as a set of key points associated with that object. The device forms, for each of the plurality of objects, a set of timeseries of the set of key points associated with that object. The device performs reidentification of a particular one of the plurality of objects across video data captured by two or more of the plurality of cameras by matching sets of timeseries of key points associated with that object derived from video data captured by two or more of the plurality of cameras. The device provides an indication of the reidentification for display to a user.

Operationally, in various embodiments, a key observation herein is that each individual object depicted in video data can be represented as a set of timeseries of its constituent key points. In general, the key points of an object are the one or more coordinate points of the object that may be interconnected and represent the overall shape or kinematics of the object at any given time. Thus, when the depicted object moves, its key points will also change, accordingly, allowing for the object to be represented as a set of timeseries of its key points, which capture the dynamics of the object. In addition, the characteristics of these timeseries, such as their frequencies, amplitudes, time series subsequence motifs, discords, semantic segmentations, etc., essentially form a 'fingerprint' for the object, allowing the system to distinguish between different objects, even across different video streams.

Figure 4A:
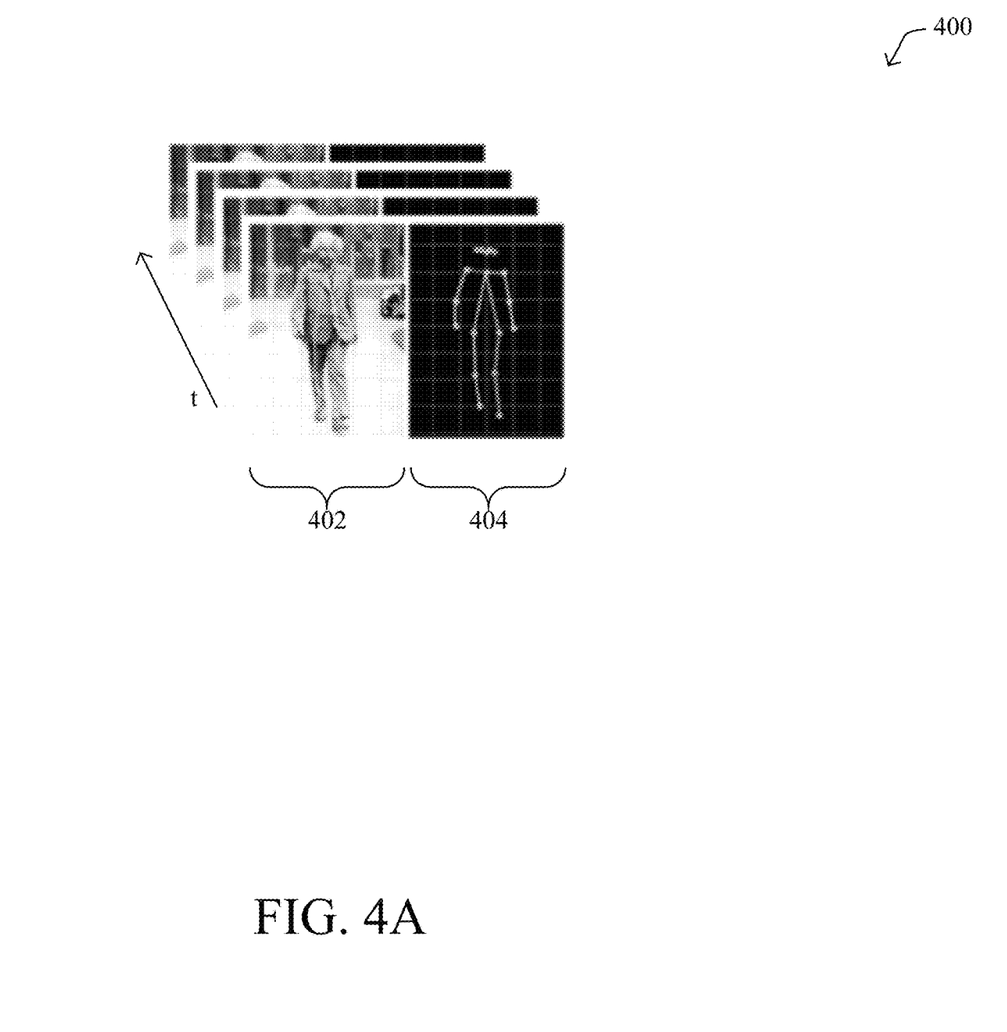
FIGS. 4A-4B illustrates an example of converting video data depicting an object over time into a set of key points and representing those sets as timeseries.
Figure 4B:
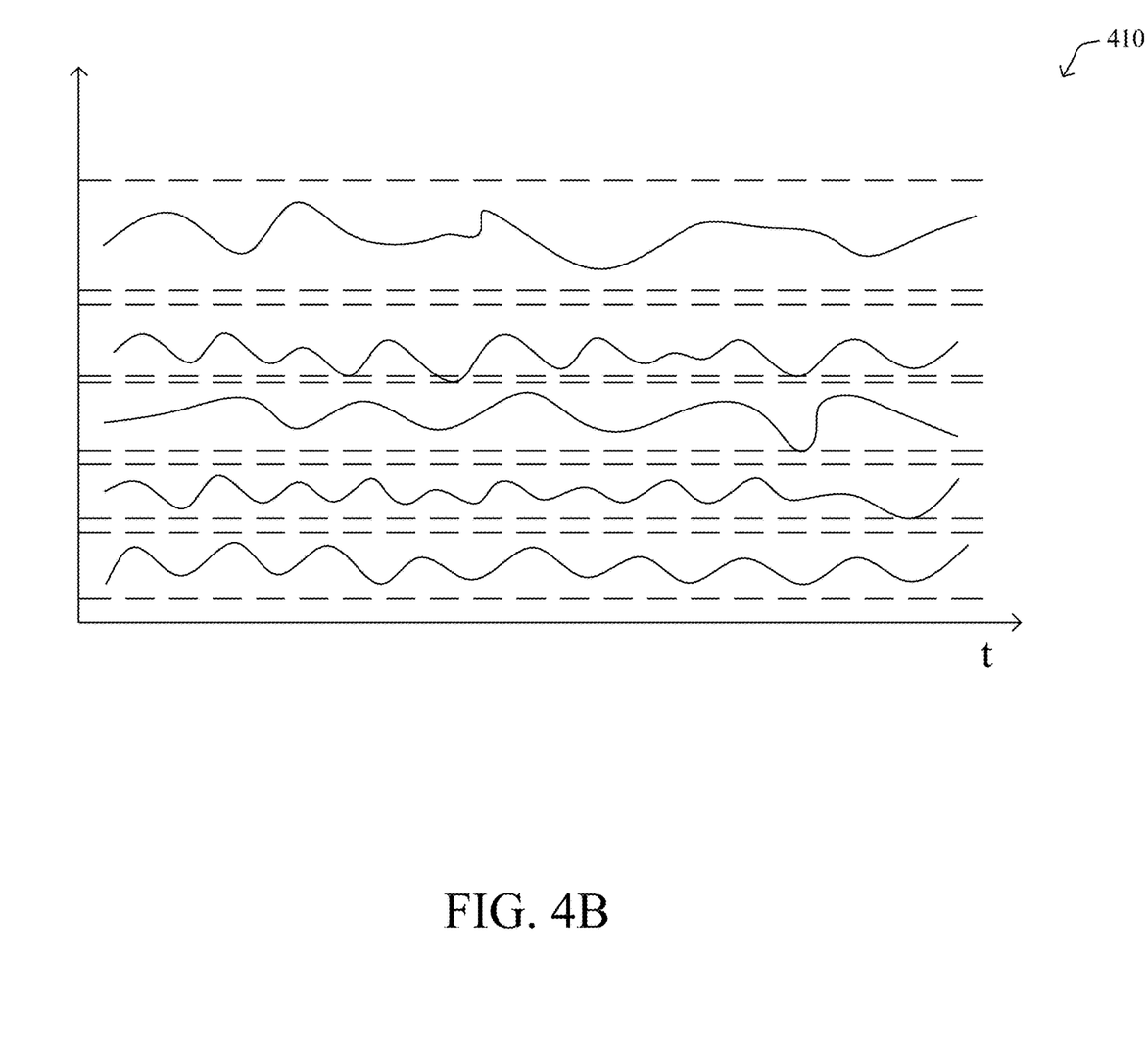

By way of example, FIGS. 4A-4B illustrates an example of converting video data depicting an object over time into a set of key points and representing those sets as timeseries. More specifically, FIG. 4A illustrates the extraction 400 of key points from video data 402 captured over time. As shown, assume that video data 402 depicts a person walking and comprises a series of images captured over time.

In various embodiments, video analytics process 248 may employ pose estimation to the person in each image in video data 402, to extract out a corresponding set of key points 404 that represent the dynamics of the person. As would be appreciated, pose estimation generally seeks to model the pose/shape of a depicted person as a set of interconnected key points. For instance, the key points of the depicted person may be associated with different body parts of the person, such as different parts of their limbs, torso, neck, head, etc.

In some instances, each key point may present a joint or other point of articulation on the human body, allowing the connections between the key points to represent the different structures connected to these points of articulation. For example, one key point may represent the left knee of the person and have two connections: a first connection to another key point that represents the left hip of the person and a second connection that represents the left ankle of the person. Thus, the first connection will effectively represent the left thigh of the person and the second connection will effectively represent their left shin. Of course, the number of key points used for any given type of object may also be varied, as desired, as well.

As would be appreciated, different object may have different kinematic models that can be used to extract their key points from the captured video data. To this end, video analytics process 248 may perform an initial classification of any detected object, to select an appropriate model for its analysis. For instance, in the case of video data 402, video analytics process 248 may determine that video data 402 depicts a person and apply a human pose estimation model to it, to extract out the set of key points 404 for each analyzed frame.

In some embodiments, video analytics process 248 may also consider perspective invariant metrics (e.g., when detecting the key points of an object and forming its timeseries), to help ensure that the video analytics will work with various camera angles, camera heights, distances to the cameras, etc. In addition, in one embodiment, video analytics process 248 may also leverage homology based ground plane detection. Doing so allows video analytics process 248 to identify planes within the video, such as walls, the floor, and the like, which may also aid in the identification of the perspective invariant metrics. For instance, video analytics process 248 may assign coordinates to the key points relative to one or more detected surfaces/planes, such as the floor, walls, etc. in the monitored area, thereby making the coordinates agnostic as to the perspectives of the cameras (e.g., a given key point will always be x-number of feet above the ground, regardless of the perspective).

As shown in FIG. 4B, video analytics process 248 may then convert the extracted sets of key points for a detected object into a set of timeseries 410. For any given key point, its corresponding timeseries may represent its change in coordinates over time, its location relative to one or more other key points, its spatial movement over time (e.g., its velocity, its direction of motion, etc.), combinations thereof, or the like. In various embodiments, video analytics process 248 may use the set of timeseries 410 as a fingerprint for the person depicted in video data 402. Indeed, the characteristics of the timeseries (e.g., their amplitudes, frequencies, shapes, patterns, subsequence motifs, discords, semantic segmentations, etc.) will vary from one object to another enough that video analytics process 248 can treat them as representations of the object. In turn, video analytics process 248 may use this information to distinguish that person or other object from others, (re-)identifying the person or other object across different video streams, and the like.

According to various embodiments, the above timeseries analysis can also be extended to groups of objects, even in a crowded area. To do so, in some embodiments, video analytics process 248 may employ self-supervised learning to label different groups of objects and/or label their behaviors. For instance, video analytics process 248 could group the data based on different levels of timeseries analysis and/or different metrics.

Another observation herein is that the sets of timeseries generated using the above approach essentially serves as a 'fingerprint' of a given object, allowing for the reidentification of the object across different video streams through the use of pattern matching. By way of example, consider the motion of a person's arms as they walk. Some people may greatly swing their arms as they walk, while others may not move their arms much at all. Similarly, some people may walk almost entirely upright, while others may walk slightly hunched over. All of these differences add up to a unique set of features through which a machine learning model can be trained to match across different sets of frames, even if they are slight enough to be almost imperceivable by the human eye.

Figure 5:
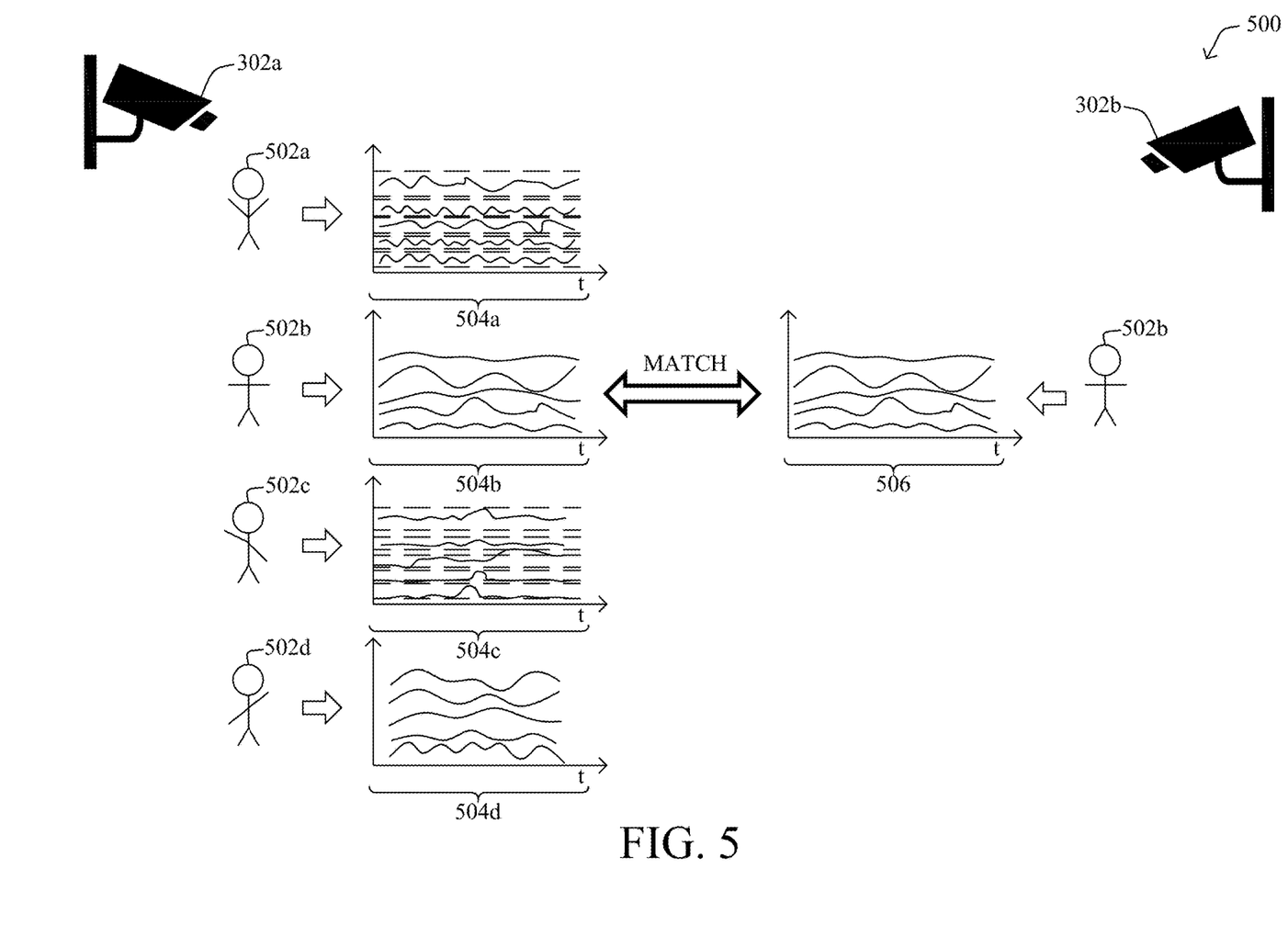
FIG. 5 illustrates an example of privacy preserving person reidentification.

FIG. 5 illustrates an example 500 of privacy preserving person reidentification, according to various embodiments. As shown, assume that cameras 302a and 302b from FIG. 3 each capture video data from a given area from different angles. In doing so, the video data from camera 302a over time may depict a plurality of people 502a-502d. Using the above techniques, video analytics process 248 may then represent each of people 502a-502d as their own set of key points (e.g., based on the estimated locations of their shoulders, heads, knees, etc.). From this, the location of each key point over time may form its own timeseries. Thus, person 502a may have an associated set of timeseries 504a, person 502b may have an associated set of timeseries 504b, person 502c may have an associated set of timeseries 504c, and person 502d may have an associated set of timeseries 504d, based on the analysis of the video data from camera 302a by video analytics process 248.

Similarly, assume that person 502b may also be depicted in the video data captured by camera 302b. Consequently, video analytics process 248 may also analyze this video data, detect the key points of person 502b, and generate a set of timeseries 506 from those key points. For simplicity, only person 502b is assumed to be depicted in the video data from 302b. However, as would be appreciated, the video data from camera 302b may depict any number of objects that are also depicted in the video data from camera 302a and video analytics process 248 may perform a similar analysis with respect to each of these objects, accordingly.

In various embodiments, to perform reidentification of person 502b across the video data from cameras 302a-302b, video analytics process 248 may attempt to match the sets of timeseries derived from the video data from one camera to those of the other camera(s). To do so, video analytics process 248 may compare the characteristics of the constituent timeseries in each set (e.g., their amplitudes, frequencies, variations, time series subsequence motifs, discords, semantic segmentations, etc. over time) to those of the sets of timeseries from other cameras. If such a match is made, video analytics process 248 may then deem that the object represented by both sets of timeseries is the same object across the video data from the different cameras.

For instance, as shown, video analytics process 248 may determine that the video data from both of cameras 302a-302b depict the same person 502b by matching the set of timeseries 504b to the set of timeseries 506, thereby reidentifying person 502b across the video streams. In turn, in some embodiments, video analytics process 248 may provide an indication of this reidentification for display to a user, such as security personnel monitoring the area. For instance, this indication may take the form of an overlay for the video data from either or both of cameras 302a-302b, such as by drawing a box or other shape around the depictions of person 502b, assigning a common identifier to the depictions of person 502b, or the like.

In various embodiments, video analytics process 248 may leverage machine learning to perform its reidentification tasks. For instance, video analytics process 248 may include a self-supervised machine learning model that performs the matching between the different sets of timeseries representing the various objects in its input video data. Such a model may also, in some embodiments, apply one or more labels to the sets of timeseries, thereby allowing the user to quickly make assessments about the object (e.g., whether the object is a person, a vehicle, etc.). Of course, video analytics process 248 may also use other forms of timeseries analysis, as well, such as other statistical and/or machine learning-based approaches, to perform its matching, in further embodiments.

Figure 6:
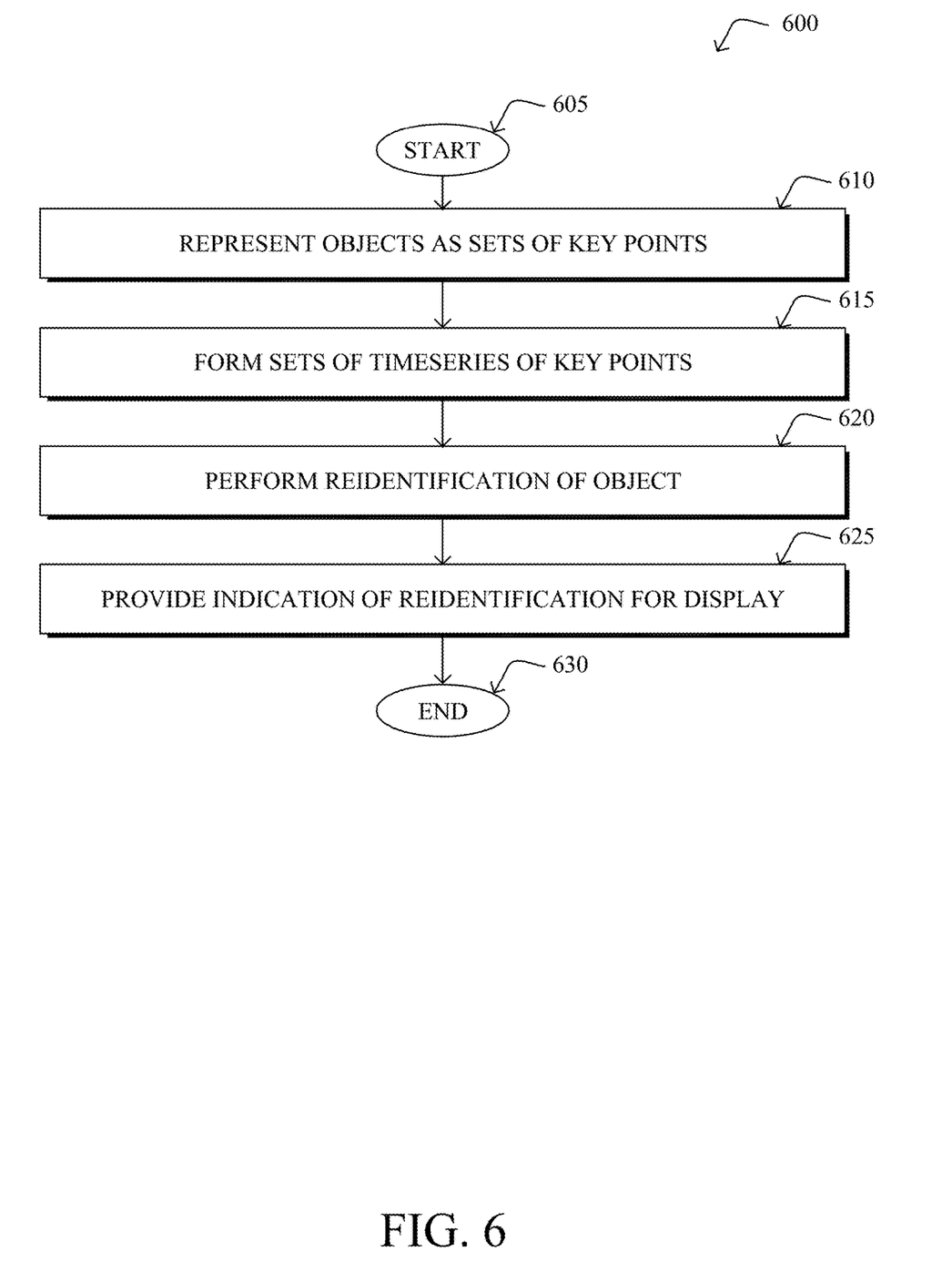
FIG. 6 illustrates an example simplified procedure for privacy preserving person reidentification.

FIG. 6 illustrates an example simplified procedure 600 (e.g., a method) for privacy preserving person reidentification, in accordance with one or more embodiments described herein. For example, a non-generic, specifically configured device (e.g., device 200), such as an edge device, a server, or other device in a network, may perform procedure 600 by executing stored instructions (e.g., video analytics process 248). The procedure 600 may start at step 605, and continues to step 610, where, as described in greater detail above, the device may represent each of a plurality of objects depicted in video data captured by a plurality of cameras over time as a set of key points associated with that object. In some embodiments, the device may do so by detecting the set of key points associated with the particular one of the plurality of objects by applying a pose estimation model to the video data depicting that object. In one embodiment, the plurality of objects comprise people detected in the video data. In further embodiments, the plurality of objects comprises one or more vehicles or animals. In yet another embodiment, the device may represent the objects as sets of key points by detecting one or more perspective invariant metrics associated with that object. To do so, in one embodiment, the device may perform homology based ground plane detection on the video data.

At step 615, as detailed above, the device may form, for each of the plurality of objects, a set of timeseries of the set of key points associated with that object. For instance, the timeseries may represent changes to the coordinates of the different key points of an object over time.

At step 620, the device may perform reidentification of a particular one of the plurality of objects across video data captured by two or more of the plurality of cameras by matching sets of timeseries of key points associated with that object derived from video data captured by two or more of the plurality of cameras, as described in greater detail above. In some embodiments, the device may do so by matching frequencies, amplitudes, subsequence motifs, discords, or semantic segmentations of the sets of timeseries of key points associated with the particular one of the plurality of objects. In further embodiments, the device uses self-supervised learning to perform the reidentification.

At step 625, as detailed above, the device may provide an indication of the reidentification for display to a user. In some embodiments, the indication of the reidentification comprises an overlay for the video data.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for privacy preserving person reidentification, it is to be understood that various other adaptations and modifications may be made within the spirit and scope of the embodiments herein. For example, while certain embodiments are described herein with respect to specific use cases for the techniques herein, the techniques can be extended without undue experimentation to other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/

RAM/EEPROM/etc.) having program instructions executing on a computer, hardware, firmware, or a combination thereof, that cause a device to perform the techniques herein. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
representing, by a device, each of a plurality of objects depicted in video data captured by a plurality of cameras over time as a set of key points associated with the each of the plurality of objects:
forming, by the device and for each of the plurality of objects and for each of the plurality of cameras, a set of timeseries of the set of key points associated with the each of the plurality of objects and the each of the plurality of cameras;
performing, by the device, reidentification of a particular one of the plurality of objects across video data captured by two or more of the plurality of cameras by matching two or more sets of timeseries of key points associated with the particular one of the plurality of objects derived from video data captured by the two or more of the plurality of cameras to each other; and
providing, by the device, an indication of the reidentification for display to a user.

2. The method as in claim 1, wherein representing each of the plurality of objects depicted in the video data captured by the plurality of cameras over time as a set of key points associated with the each of the plurality of object by:
detecting the set of key points associated with the particular one of the plurality of objects by applying a pose estimation model to the video data depicting the particular one of the plurality of objects.

3. The method as in claim 1, wherein the plurality of objects comprise people detected in the video data.

4. The method as in claim 1, wherein performing the reidentification comprises:
matching frequencies, amplitudes, subsequence motifs, discords, or semantic segmentations of the two or more sets of timeseries of key points associated with the particular one of the plurality of objects derived from video data captured by the two or more of the plurality of cameras to each other.

5. The method as in claim 1, wherein the indication of the reidentification comprises an overlay for the video data.

6. The method as in claim 1, wherein representing each of the plurality of objects as a set of key points associated with that object comprises:
detecting one or more perspective invariant metrics associated with the each of the plurality of objects.

7. The method as in claim 6, wherein the device detects the one or more perspective invariant metrics in part by:
performing homology based ground plane detection on the video data.

8. The method as in claim 1, wherein the device uses self-supervised learning to perform the reidentification.

9. The method as in claim 1, wherein the plurality of objects comprises one or more vehicles or animals.

10. The method as in claim 1, wherein the device is an edge device in a network.

11. An apparatus, comprising:
a network interface to communicate with a computer network;
a processor coupled to the network interface and configured to execute one or more processes; and
a memory configured to store a process that is executed by the processor, the process when executed configured to:
represent each of a plurality of objects depicted in video data captured by a plurality of cameras over time as a set of key points associated with se each of the plurality of objects;
form, for each of the plurality of objects and for each of the plurality of cameras, a set of timeseries of the set of key points associated with the each of the plurality of objects and the each of the plurality of cameras;
perform reidentification of a particular one of the plurality of objects across video data captured by two or more of the plurality of cameras by matching two or more sets of timeseries of key points associated with the particular one of the plurality of objects derived from video data captured by the two or more of the plurality of cameras to each other; and
provide an indication of the reidentification for display to a user.

12. The apparatus as in claim 11, wherein the apparatus represents each of the plurality of objects depicted in the video data captured by the plurality of cameras over time as a set of key points associated with the each of the plurality objects by:
detecting the set of key points associated with the particular one of the plurality of objects by applying a pose estimation model to the video data depicting the particular one of the plurality of objects.

13. The apparatus as in claim 11, wherein the plurality of objects comprise people detected in the video data.

14. The apparatus as in claim 11, wherein the apparatus performs the reidentification by:
matching frequencies, amplitudes, subsequence motifs, discords, or semantic segmentations of the two or more sets of timeseries of key points associated with the particular one of the plurality of objects derived from video data captured by the two or more of the plurality of cameras to each other.

15. The apparatus as in claim 11, wherein the indication of the reidentification comprises an overlay for the video data.

16. The apparatus as in claim 11, wherein the apparatus represents each of the plurality of objects as a set of key points associated with that object by:
detecting one or more perspective invariant metrics associated with the each of the plurality of objects.

17. The apparatus as in claim 16, wherein the apparatus detects the one or more perspective invariant metrics in part by:
performing homology based ground plane detection on the video data.

18. The apparatus as in claim 11, wherein the apparatus uses self-supervised learning to perform the reidentification.

19. The apparatus as in claim 11, wherein the plurality of objects comprises one or more vehicles or animals.

20. A tangible, non-transitory, computer-readable medium storing program instructions that cause a device to execute a process comprising:
representing, by the device, each of a plurality of objects depicted in video data captured by a plurality of cameras over time as a set of key points associated with the each of the plurality of objects;
forming, by the device and for each of the plurality of objects and for each of the plurality of cameras, a set of timeseries of the set of key points associated with the each of the plurality of objects and the each of the plurality of cameras;

performing, by the device, reidentification of a particular one of the plurality of objects across video data captured by two or more of the plurality of cameras by matching two or more sets of timeseries of key points associated with the particular one of the plurality of objects derived from video data captured by the two or more of the plurality of cameras to each other; and providing, by the device, an indication of the reidentification for display to a user.

* * * * *